No. 879,434. PATENTED FEB. 18, 1908.
J. A. BAILEY.
BAKING PAN.
APPLICATION FILED MAR. 21, 1906.
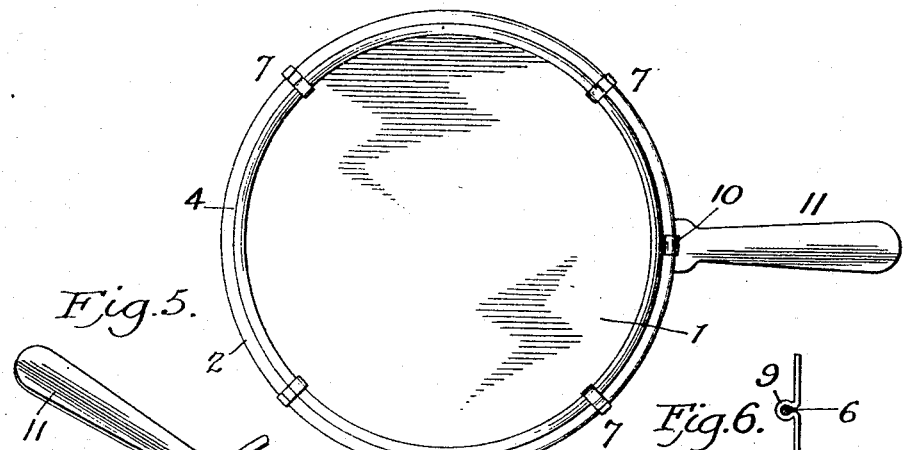
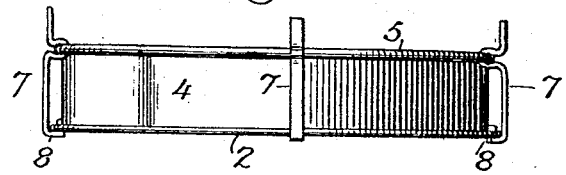
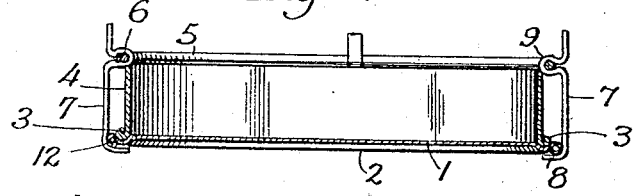
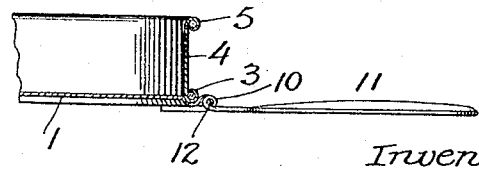
Witnesses:
James F. Duhamel
Alice McCabe
Inventor,
Jeanne A. Bailey.
by Victor J. Evans
Attorney.

ns rATENT OFFICE.

JEANNE A. BAILEY, OF BROOKLYN, NEW YORK.

BAKING-PAN.

No. 879,434.

Specification of Letters Patent.

Patented Feb. 18, 1908.

Application filed March 21, 1906. Serial No. 307,261.

*To all whom it may concern:*

Be it known that I, JEANNE A. BAILEY, a citizen of the United States, residing at Brooklyn, in the county of Kings and State of New York, have invented new and useful Improvements in Baking-Pans, of which the following is a specification.

My invention relates to baking-pans and has for its object new and novel constructions which permit of the rapid separation of the parts of the pan so that the cake or bread which has been baked therein may be easily removed without damage to same. These and other objects and details of construction of the invention are more fully described in the following specification and set forth in the appended claims.

In the drawings forming a part of this specification similar reference characters are used to designate the same parts in the various figures.

Figure 1 is a plan view of my improved baking pan. Fig. 2 is a side elevation of same. Fig. 3 is a cross-sectional view. Fig. 4 is a sectional detail. Fig. 5 is a perspective view of the handle. Fig. 6 is a side view of one of the connecting clamps detached.

The pan is made up of two parts, a bottom 1 having a bead 2 around its periphery into which is adapted to fit the bead 3 of the body of the pan which consists of a ring 4 having at its top a bead 5 inclosing a wire 6 which runs around the entire upper edge of this section of the pan. At certain points a round this upper edge the bead 5 is cut away in order to expose portions of the wire $6^a$.

The clamps 7 are bent at points between their ends to provide eyes 9 which project at right angles to the planes of the clamps, and are bent at their lower ends to provide bottom engaging members 8, which project therefrom in the direction of the projection of the eyes 9. Those portions of the clamps 7 located above the eyes 9 provide combined supports and handles by means of which the clamps may be manipulated to move the members 8 into or out of engagement with the bottom 1, and by means of which the pan may be supported in inverted position. The clamps are pivotally secured to the exposed portions of the wire 6 through the medium of the eyes 9, and in view of the angular relation of the eyes 9 to the clamps, the combined handles and supports are arranged exteriorly of the plane of the body of the pan, in which position they do not form obstructions to the removal of the contents of the pan.

In Fig. 5 I show a handle which is adapted to be folded up in an upright position and is provided with an eye 10 cut from the material of which the handle 11 is made and which is folded around the wire 12 carried in the outer bead of the bottom plate 1. The remaining portion of this handle adjacent to the eye 10 forms two fingers 13 which are adapted to fit beneath the plate 1 and support the same when the whole device is lifted by means of the handle. The fingers 13 are made of such length, and are so disposed, that when the pan is withdrawn from the oven, by tilting the handle in an upward direction, the said fingers will form supporting members whereby the pan may be supported temporarily in an inclined position so as to permit air to circulate beneath the bottom thereof, which is extremely desirable, as is well known, for the purpose of enabling the cake to cool without becoming heavy and soggy. This is an extremely desirable feature of the invention, since, by means of this simple device, the pan may be handled and adjusted and supported without necessity of touching the body of the pan and without necessity of propping up the latter by the separate and independent means usually employed for that purpose. In thus arranging the clamps which are to hold the two sections of the pan together they are retained in a proper position for immediate action and insured against loss which would be the inevitable consequence if these parts were separate and independent. To release these clamps it is simply necessary to insert a knife, fork or spoon between the clamp and the rim of the band and give the same a quick turn throwing the angle 8 from beneath the bottom of the pan and permitting the parts to separate.

Various modifications may be resorted to in the construction of this baking pan without departing from the essential features which are described in the claims.

Having thus described my invention, I claim—

A baking pan consisting of an annular body having reinforcing beads and wires at its upper and lower ends, the upper bead being cut away at intervals to expose the wire, and clamping members having inwardly extended eyes pivotally engaging the exposed portions of the wires and provided at their lower extremities with inwardly extended hooks or offsets, in combination with a detachable bottom member having an annular reinforcing bead and wire, said bead being cut away to expose a portion of the wire, and a handle pivotally engaging the exposed portion of the wire of the bottom member and having extended fingers of suitable length to engage the underside of the bottom member and form a stop for the handle when the latter is extended radially from said bottom member and to form props or supports whereby the bottom member may be maintained in a tilted or inclined position when the handle member is upturned at an angle to the bottom member.

In testimony whereof, I affix my signature in presence of two witnesses.

JEANNE A. BAILEY.

Witnesses:
JAMES F. DUHAMEL,
H. G. HOSE.